P. J. CUBBISON.
SHOCK ABSORBER.
APPLICATION FILED APR. 2, 1917.
1,367,866.
Patented Feb. 8, 1921.
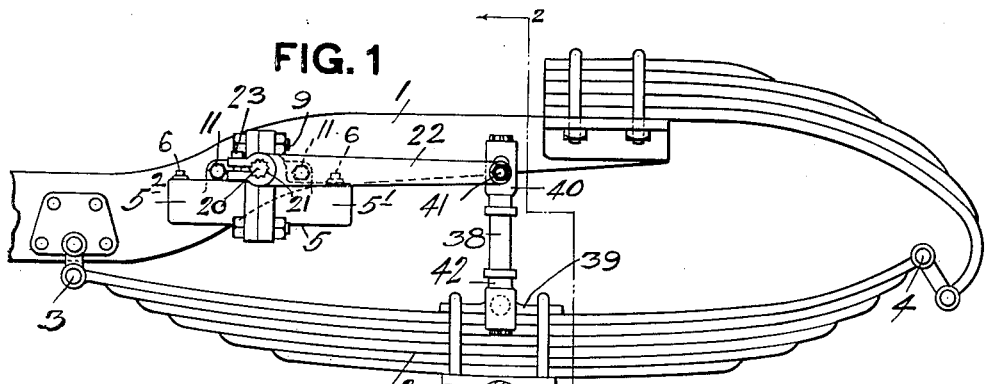
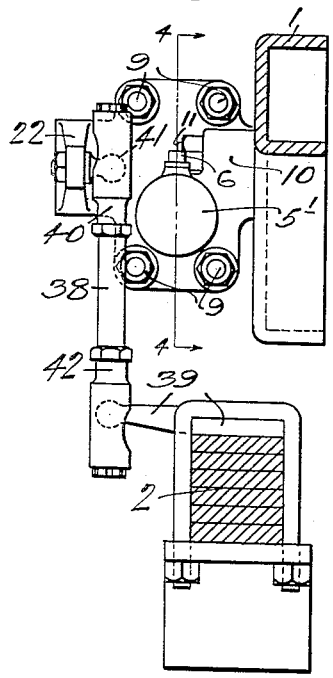
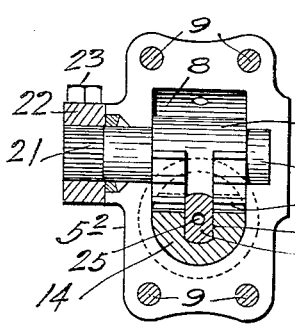
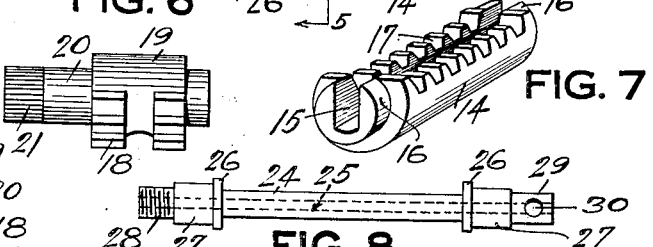
INVENTOR
Paul J. Cubbison

UNITED STATES PATENT OFFICE.

PAUL J. CUBBISON, OF NEW CASTLE, PENNSYLVANIA.

SHOCK-ABSORBER.

1,367,866.  Specification of Letters Patent.  Patented Feb. 8, 1921.

Application filed April 2, 1917. Serial No. 159,173.

*To all whom it may concern:*

Be it known that I, PAUL J. CUBBISON, a citizen of the United States, and a resident of New Castle, in the county of Lawrence and State of Pennsylvania, have invented a new and useful Improvement in Shock-Absorbers; and I do hereby declare the following to be a full, clear, and exact description thereof.

My invention relates to improvements in shock absorbers for vehicles, particularly, though not exclusively, motor vehicles. It is, of course, adapted to any heavy vehicle.

The object of the invention is to provide a device which will not interfere with slight vibrations of the vehicle body on the springs, but will permit such vibrations freely. A further object is to provide a device which will yield to heavy impacts on the vehicle springs during the earlier part of said impacts, thus allowing the vehicle springs to exert their full effect in absorbing the impact, and after such initial movement of the springs under heavy impact, the shock-absorber will oppose strong resistance to the further collapse or further expansion of the spring, which resistance will decrease in proportion to the decrease of the movements of the spring, until the spring has reached the end of the stroke, whereupon the movement of the vehicle spring and the resistance of the absorber become zero, and then the absorber will permit the initial portion of the rebound movement to take place comparatively freely, again allowing the spring to exert its normal function; and again, the absorber will oppose strong resistance to the rebound movement of the spring until again the movement of the spring on rebound and resistance thereto of the absorber become zero.

This invention contemplates the use of a moving element, which may be in the form of a piston, which moves in a confined body of fluid, such as oil, and whose movement is more or less opposed by this fluid. A further object of the invention is to provide a construction in which the portion of this fluid which is brought under pressure from time to time, shall not have access to the bearings of the confining vessel through which the connection between the moving element and the vehicle body or spring extends. This is of the utmost importance for the reason that when the fluid is under pressure, it will seek egress through the slightest or most minute opening and will thereby become exhausted and no longer capable of performing its opposing function.

With these and other objects in view, as will appear from the following description, the invention consists of a construction and arrangement of parts, one embodiment of which is illustrated in the accompanying drawing, in which Figure 1 is a fragmentary side elevation of a portion of the vehicle frame and spring showing the invention applied thereto; Fig. 2 is an end elevation of the device showing the body frame and spring in section; Fig. 3 is a plan view; Fig. 4 is a longitudinal sectional view on the line 4—4, Fig. 2; Fig. 5 is a sectional view on the line 5—5, Fig. 4; Fig. 6 is a detail of the connection between the moving element and the absorber arm; Fig. 7 is a detail view of a portion of the moving element; and Fig. 8 is a further view of a detail of the moving element.

In the embodiment of the invention herein selected for illustration, 1 indicates a portion of the vehicle frame, and 2 indicates the lower member of a three-quarters elliptical spring. The spring is shackled to the vehicle frame at 3 in the usual manner and to the semi-elliptic upper member of the spring at 4. The body of the shock absorber, which constitutes the fluid-confining portion is indicated at 5. This body or fluid-vessel comprises two halves, $5'$ and $5^2$. The fluid-confining portions of this vessel may be cylindrical in form and provided with tap-plugs 6—6 for filling the vessel with fluid. At the junction of these two halves of the body is formed a pair of transverse, semi-cylindrical bosses 7, which together form a transverse chamber 8. The sections of the body are held together by suitable bolts and nuts 9, 9, and each half is provided with a lug 10 by which the device may be bolted to the frame of the machine by the bolts 11. The transverse cylindrical chamber 8 at the junctions of the two halves of the body is tapped by the screw-plug 12 to fill the central portion of the fluid-receiving chamber 13 of the body portion. Within the fluid-receiving chamber is mounted a moving element 14 comprising, as shown in this instance, a semi-cylindrical body slotted from end to end at 15 and having cylindrical extensions 16 at its opposite ends. This movable element is provided with gear-teeth 17 adapted to mesh with the gear-teeth 18 of a pinion 19, such as shown in Fig. 6, said pinion having a shaft 20 extending beyond either side thereof, one end of said shaft being provided with ratchet-teeth 21 upon which a lever-arm 22 may be clamped by a screw 23, Fig. 3. The slot 15 of the moving element 14 is adapted to receive a piston-bar or rod 24, which rod has a longitudinal passage 25 therein. Said rod may be squared in cross-section, as shown in Fig. 5, to fit within the slot 15, and each end of the rod is provided with a shoulder 26, a cylindrical portion 27, and one end is threaded as at 28, and the opposite end is left smooth as at 29, said opposite end also being provided with a transverse opening 30 to receive a regulating-cock 31, which passes not only through the end 29 of the piston-rod, but also holds a short sleeve 32 on the end of the rod to form an abutment for the piston-packing. On the bosses 27 at each end of the piston-rod is mounted a piston-ring or disk 33 which abuts at either side against the shoulders 26; and between the piston-rings or disks 33 and the enlarged or body portion of the moving element 14 are mounted springs 34. Outside of each piston-ring or plate 33, and on the extensions 27 of the piston-rod are mounted cup-shaped fabric piston-rings 35, outside of which are piston-holding rings 36, which at the left-hand end of the piston-rod, as shown in Fig. 4, are confined by lock-nuts 37, and at the right-hand end of the piston-rod are confined by the short-sleeve 32. The moving element 14 with the piston-rod and piston-rings thereon is centrally positioned within the casing or chamber formed by the two halves 5' and 5² of the body portion with the teeth of the pinion 19 engaging the gear-teeth 17 of said movable element 14. The halves of the body of the device are then bolted together. The piston or plunger chambers 13 are then filled with fluid, such as oil, through the screw-plug openings 6, and the central portion of the body portion is partly filled to about half the height of the shaft 20 with fluid through the opening for the screw-plug 12. It will be seen from an inspection of sectional view, Fig. 4, that the outer ends of the main chamber 13 are completely isolated from the central chamber 8 in which the pinion 19 engages with the tooth-member 14; and it will be further seen that the opposite ends of the chamber 13 communicate with each other through the passage 25 in the piston-rod 24. By reason of the fact that the fluid in the central chamber 8 does not ordinarily communicate with the fluid which comes under pressure in the opposite ends of the chamber 13, it will be evident that no pressure is exerted on the body of fluid in the chamber 8 and, therefore, there is no tendency of the fluid to escape through the bearings in the body portion of the device to the shaft 20. But seepage may take place from chamber 8 to chamber 13 past piston-ring 35 to keep chamber 13 full; and also when piston draws away from one end of chamber 13, oil from chamber 8 will be sucked to a small degree to chamber 13.

The rocker-arm 22 of the absorber is connected by a link 38 with the spring-plate 39 of the lower half 2 of the three-quarters elliptical spring. This link 38 may be provided with the adjustable sleeve 40 with which the rocker-arm is directly pivotally connected at 41 and with an adjustable end 42 for connection with the spring-plate 39.

It will be noted on inspection of Fig. 4 that when the movable member 14 and the piston-rod 24 with its piston-rings and springs are assembled, there are left spaces 43 between the ends of the bosses 16 of the movable member 14 and the piston-rings or disks 33 so that the first movements of the movable member 14 caused by the turning of the pinion 19 may be taken up by the springs 34.

In the operation of the device and after the chambers 13 and the central chamber 8 have been filled with fluid, it will be noted that any movement of the movable member 14 and the piston-rod 24, together with the piston elements on each end of this piston-rod, will cause a displacement of fluid from one end of the chamber 13 to the opposite end thereof through the passage 25 in the piston-rod.

Slight impacts on the vehicle spring will be taken up through the link 38, arm 22, pinion shaft 20, pinion 19, movable member 14, and finally by the springs 34 without necessarily moving the piston members at either end of the piston-rod 24, though it may be that a slight amount of fluid may be displaced from one end of the chamber 13 through a passage 25 in the piston-rod. However, in the main, these slight impacts are practically absorbed by the springs 34. For a somewhat greater impact, the movement of the vehicle spring is taken up not only through the elements named by the springs 34, but by a greater displacement of fluid through the piston-rod passage 25. And for a heavy impact on the vehicle spring, the initial portion of such impact is taken up by the springs 34 and displacement of the fluid through the piston-rod passage 25, but when the movement of the vehicle spring is extended beyond a comparatively normal degree, the movement of the movable member 14 and the piston-rings thereon is opposed by the fluid in the one end of the chamber 13, depending upon the direction of the movement of the piston, and in proportion as the tendency to displace the fluid extends the amount which can pass through the passage 25 in the piston-rod 24, the greater will be the opposition to movement of the piston, thus the extended or latter part of the movement of the piston caused by a heavy impact on the vehicle spring will be powerfully opposed by the fluid in the shock-absorber chamber. But the moment the spring begins to rebound and thus cause a reverse movement of the piston within the shock-absorber chamber, the first portion of the rebound movement of the piston is taken up again by one of the springs 34, and by the displacement of the fluid from one end of the chamber 13 to the other through the passage 25, and, therefore, the first part of the rebound movement of the vehicle spring is allowed to take place substantially in the normal way. But when this rebound movement of the vehicle spring becomes excessive and tends to go beyond the normal position of the vehicle spring, then the same opposition of the fluid in the shock-absorber chamber takes place and opposes such extended rebound movement.

Consequently, as above stated, this shock absorber provides means to permit slight impacts of the vehicle spring to be absorbed by the normal spring action of said vehicle springs. Heavier impacts on the vehicle springs are initially unopposed but opposition increases as the force of impact increases; and finally for heavy impacts on the vehicle spring, initial movement of the spring is practically unopposed and increased movement is opposed to a greater degree; and finally excessive movement of the vehicle spring is effectually checked by the opposition of the fluid in the absorber chamber.

It is evident that any downward thrust of the pinion 18 on the movable member 14 is not communicative to the piston since the piston lies free in the groove or slot 15 in said member 14.

But this invention contemplates a further advantage in an absorber of this character. If, for example, the pressure in the fluid in the opposite ends of the absorber chamber were communicated to the fluid which lies in the central portion 8 of the absorber chamber between the piston members, and in communication with the bearing of the shaft 20 of the pinion 19, then such pressure on the fluid would cause the fluid to leak out through such bearing and escape from the absorber chamber so that finally there would not be sufficient fluid in the chamber to effectually perform the shock-absorbing functions. But it will be noted that the fluid in the ends of the chamber 13 is effectually isolated during compression from the body of fluid in the central chamber 8, and the fluid in the central chamber 8 is merely moved idly to and fro with the movement of the piston-plunger; hence, there is no tendency of escape of this fluid through the bearing of the shaft 20 of the pinion 19. And, obviously, from an inspection of Fig. 4 of the drawing, it will be seen that there is no other escape of fluid from the shock-absorber chambers. This is an extremely important feature, for the great objection to shock-absorbers using fluid has been heretofore that no effective means could be found for preventing the escape of fluid when under heavy, sudden pressure due to the performance of its shock-absorbing functions.

It will be seen also that the oil both in chambers 8 and 13 will lubricate the device thoroughly.

While I have herein described a particular embodiment of the invention and have specified a particular construction and arrangement of parts, it is obvious that the gist of the invention is not confined to such particular construction and arrangement, but the invention may be embodied in many different forms within the scope of the appended claims.

What I claim is:

1. The combination with a vehicle frame and axle, of a shock-absorber comprising a casing secured to one of said vehicle parts, a plunger in said casing, a rocking-arm connected with said plunger and secured to the other vehicle part, a fluid in said casing adapted to oppose excessive movements of the plunger, and resilient means associated with said plunger for permitting slight relative movements between the vehicle frame and axle without effecting movement of the plunger.

2. The combination with a vehicle frame and axle, of a shock-absorber comprising a plunger casing attached to one of said vehicle parts, a plunger adapted to move longitudinally in said casing, fluid chambers at either end of said casing containing fluid adapted to oppose movements of the plunger, and resilient means associated with said plunger for permitting slight relative movements between the vehicle frame and axle whereby excessive movements between the frame and axle are not initially opposed by the fluid in the chambers.

3. The combination with the vehicle frame and axle, of a casing secured to one of said vehicles parts, a plunger within said casing having connection with the other of said vehicle parts whereby relative movement between the frame and axle will cause movements of the plunger within said casing in either direction, fluid chambers in said casing containing fluid adapted to oppose movements of the plunger therein, spring controlled means associated with said plunger for permitting initial movement of frame and axle on slight impacts without effecting movement of the plunger, means whereby heavier impacts are met with increased opposition, and means whereby any fluid which may escape between said casing and plunger will be drawn back into its original chamber during reverse movement of the plunger.

4. The combination with a vehicle frame and axle, of a casing secured to one of said parts, a plunger in said casing, and a resilient lost motion connection associated with said plunger and disposed between the plunger and the other of said parts for permitting initial relative movement of the parts without effecting movement of the plunger.

5. In a shock absorber, the combination with a casing, of a plunger operable therein, a rocker arm for operating said plunger, and a resilient lost motion connection between said rocker arm and said plunger.

6. In a shock absorber, the combination with a casing, of a plunger operable therein, a rocker arm for operating said plunger, means for yieldingly connecting the rocker arm to the plunger whereby the rocker arm may have a predetermined movement before imparting movement to the plunger.

7. In a shock absorber, the combination with a casing, of a double-acting plunger operable therein, said plunger comprising plunger heads and a connecting rod, an element slidably mounted on the connecting rod for movement independent thereof, and means for imparting movement to said element.

8. In a shock absorber, the combination with a casing of a double-acting plunger operable therein, said plunger comprising plunger-heads and a connecting rod, a plunger actuating element slidably mounted on the connecting rod for movement independent thereof, means for imparting movement to said element, and means for opposing the independent movement of said element.

9. In a shock absorber, the combination with a casing of a double-acting plunger operable therein, said plunger including plunger-heads and a connecting rod, a rack member movable on said connecting rod, resilient means interposed between the ends of said member and the plunger heads for opposing the independent movement of said member, a rocker arm, a pinion actuated by said arm, said pinion meshing with said rack element.

10. In a shock absorber, the combination with a casing, of a double-acting plunger operable therein, said plunger including a pair of plunger heads and a connecting rod, a rocker arm, and a lost motion connection comprising a rack member slidable on the connecting rod, a pinion on the rocker arm meshing with said rack member, and springs interposed between the ends of the rack member and the plunger-heads.

11. The combination with a vehicle frame and axle, of a shock absorber comprising a casing connected to one of said parts, a double-headed plunger connected to the other of said parts, a free lost motion connection between the plunger and the last mentioned part, and a second but opposed lost motion connection between the plunger and said last mentioned part.

In testimony whereof, I the said PAUL J. CUBBISON, have hereunto set my hand.

PAUL J. CUBBISON.

Witnesses:
CLYDE E. WILSON,
GEORGE S. MILLER.